United States Patent
Davis, Jr.

(10) Patent No.: US 6,668,758 B1
(45) Date of Patent: Dec. 30, 2003

(54) ANIMAL HAIR DE-MATTER

(76) Inventor: Albert H. Davis, Jr., 541 Proctor Ave., Scottdale, GA (US) 30079

(*) Notice: Subject to any disclaimer, the term of this patent is extended or adjusted under 35 U.S.C. 154(b) by 0 days.

(21) Appl. No.: 10/407,732

(22) Filed: Apr. 4, 2003

(51) Int. Cl.$^7$ .................................................. A01L 13/00
(52) U.S. Cl. .................... 119/608; 119/618; 119/627; 132/129
(58) Field of Search .................. 119/608, 609, 119/611, 613, 618, 625, 627; 132/213.1, 219, 107, 119.1, 126, 127, 129, 141, 142, 151, 152

(56) References Cited

U.S. PATENT DOCUMENTS

| | | | | |
|---|---|---|---|---|
| 3,272,023 A | * | 9/1966 | Ferguson et al. | 74/55 |
| 3,384,096 A | * | 5/1968 | Paccione | 132/119.1 |
| 3,735,768 A | * | 5/1973 | Burney | 132/210 |
| 3,794,050 A | * | 2/1974 | Gallanis et al. | 132/119.1 |
| 3,850,181 A | * | 11/1974 | Baker | 132/119.1 |
| 3,946,606 A | * | 3/1976 | Abrioux et al. | 73/160 |
| 3,996,663 A | * | 12/1976 | Spanel | 30/30 |
| 4,970,990 A | * | 11/1990 | Wilhelmi | 119/601 |
| 5,911,225 A | * | 6/1999 | Carty et al. | 132/119.1 |
| 5,915,391 A | * | 6/1999 | Revil | 132/119.1 |
| 6,230,716 B1 | * | 5/2001 | Minoletti | 132/226 |
| 6,510,856 B1 | * | 1/2003 | Ahn | 132/219 |

* cited by examiner

*Primary Examiner*—Yvonne Abbott
(74) *Attorney, Agent, or Firm*—Harry I. Leon

(57) ABSTRACT

A combing device to facilitate de-matting or untangling of animal hair comprises a pair of combs, a handle unit and a switch. The handle unit comprises an internal energy conduit device through which energy or force can be caused to flow and effectuate a forceful movement of at least one of the combs. In operation, a user places the pair of combs in or near the area of an animal's matted hair and controls the switch to repeatedly cause one of the combs to forcefully move forward and then back, thereby generating repeatedly strong combing actions.

17 Claims, 4 Drawing Sheets

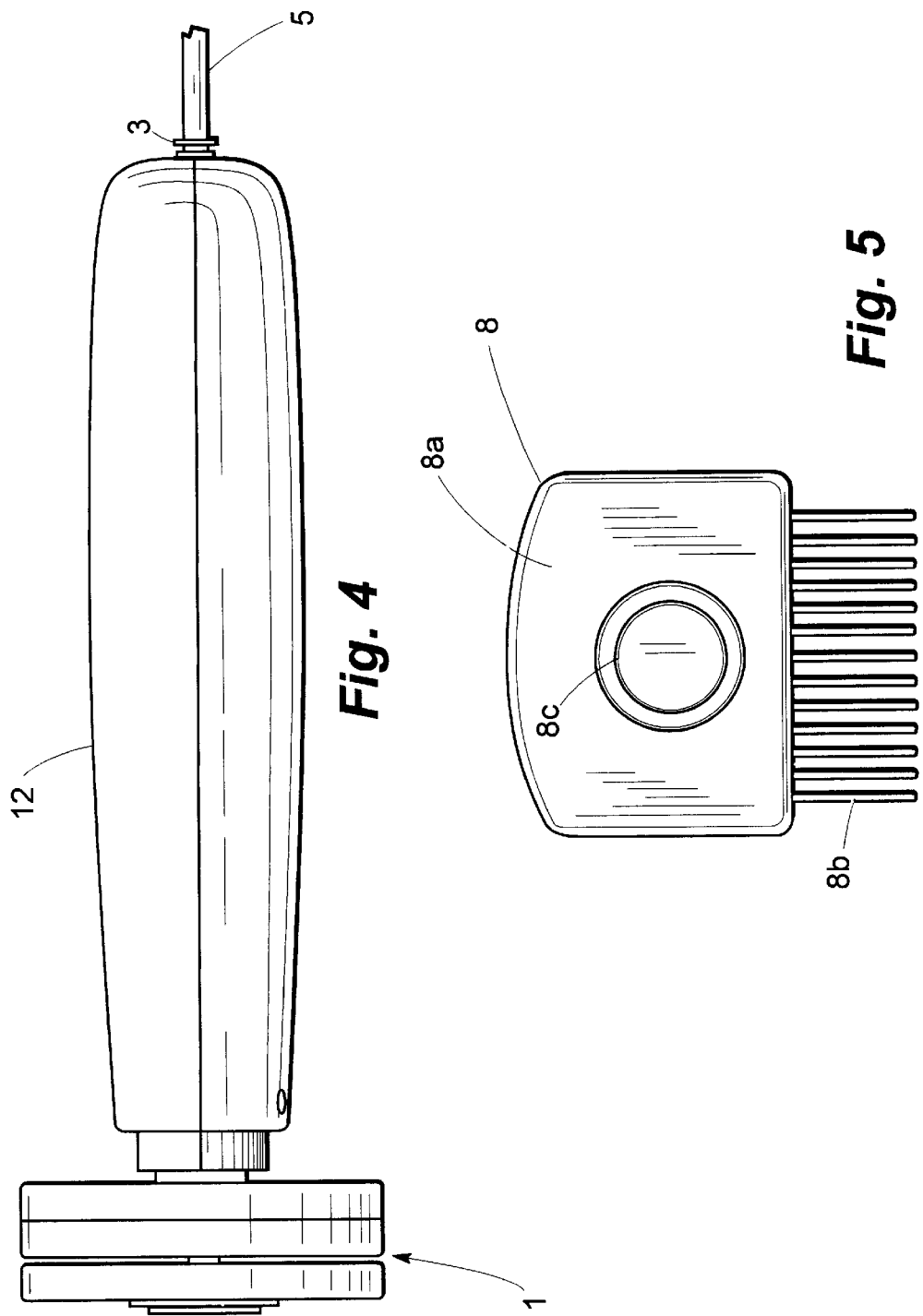

ANIMAL HAIR DE-MATTER

FIELD OF INVENTION

The present invention generally relates to apparatus and methods for grooming animals, and in particular to devices and methods for de-matting or untangling animal hair.

BACKGROUND OF THE INVENTION

Many people care for and groom animals. In this market, it is well known that animal hair often becomes matted and tangled (hereinafter "matted"). Devices such as those disclosed in U.S. Pat. Nos. 5,231,762 and 4,970,990 have been developed for de-matting or untangling (hereinafter "de-matting") animal hair. In essence, these devices cut off matted hair to achieve de-matting of animal hair.

It would be desirable to have an apparatus for de-matting animal hair without cutting off matted hair and subjecting animals to sharp blades.

SUMMARY OF INVENTION

The present invention provides a device for de-matting animal hair. The device comprises a pair of combs, a switch, and a handle unit encasing an internal energy conduit. In a normal or resting mode, the two combs are disposed adjacent to each other. However, when energy is fed, injected or caused to flow into and through the internal energy conduit, one of the combs is caused to forcefully move or displace (hereinafter "move") forward from its initial position, thereby generating a strong combing action.

In the preferred embodiment, the handle unit encases a pneumatic cylinder having a piston, a rod connected to the piston and a spring which in its de-compressed mode maintains the piston toward the back of the cylinder. The rod extends from the piston to outside or beyond (hereinafter "beyond") the handle unit and is connected to a first comb after being passed through a hollow passage defined by the second comb. The handle unit further encases a valve that can be adaptively controlled to be open or closed with respect to the cylinder by a user's action on the switch.

When a user presses the switch, the valve opens with respect to the cylinder and compressed air flows into and through the cylinder. The sudden flow and force of the compressed air pushes the piston forward, which in turn compels forward a rod connected to the piston. Furthermore, because the rod is also connected to the first comb, the sudden movement of the piston also causes the first comb to forcefully move forward from its initial position, thereby creating a strong combing action.

When the user releases the switch, the valve closes with respect to the cylinder and prevents compressed air from flowing into and through the cylinder. In the absence of force acting on the piston and pushing it forward, the spring becomes de-compressed and its elastic force moves the piston back toward its initial position prior to the user's pressing of the switch. Consequently, the rod and the first comb are restored to their initial positions, thus preparing the device for another sudden movement in response to the user's control of the switch.

In operation, the user places the pair of combs in or near matted animal hair and repeatedly controls the switch, so as to repeatedly impart or generate (hereinafter "generate") strong combing actions in or near the matted hair. Accordingly, the present invention facilitates de-matting of animal hair.

BRIEF DESCRIPTION OF DRAWINGS

FIG. 4 is a top view of the apparatus according to the present invention.

FIG. 5 is a front view of a comb according to the present invention.

DETAILED DESCRIPTION OF THE PREFERRED EMBODIMENT

Figure 1:
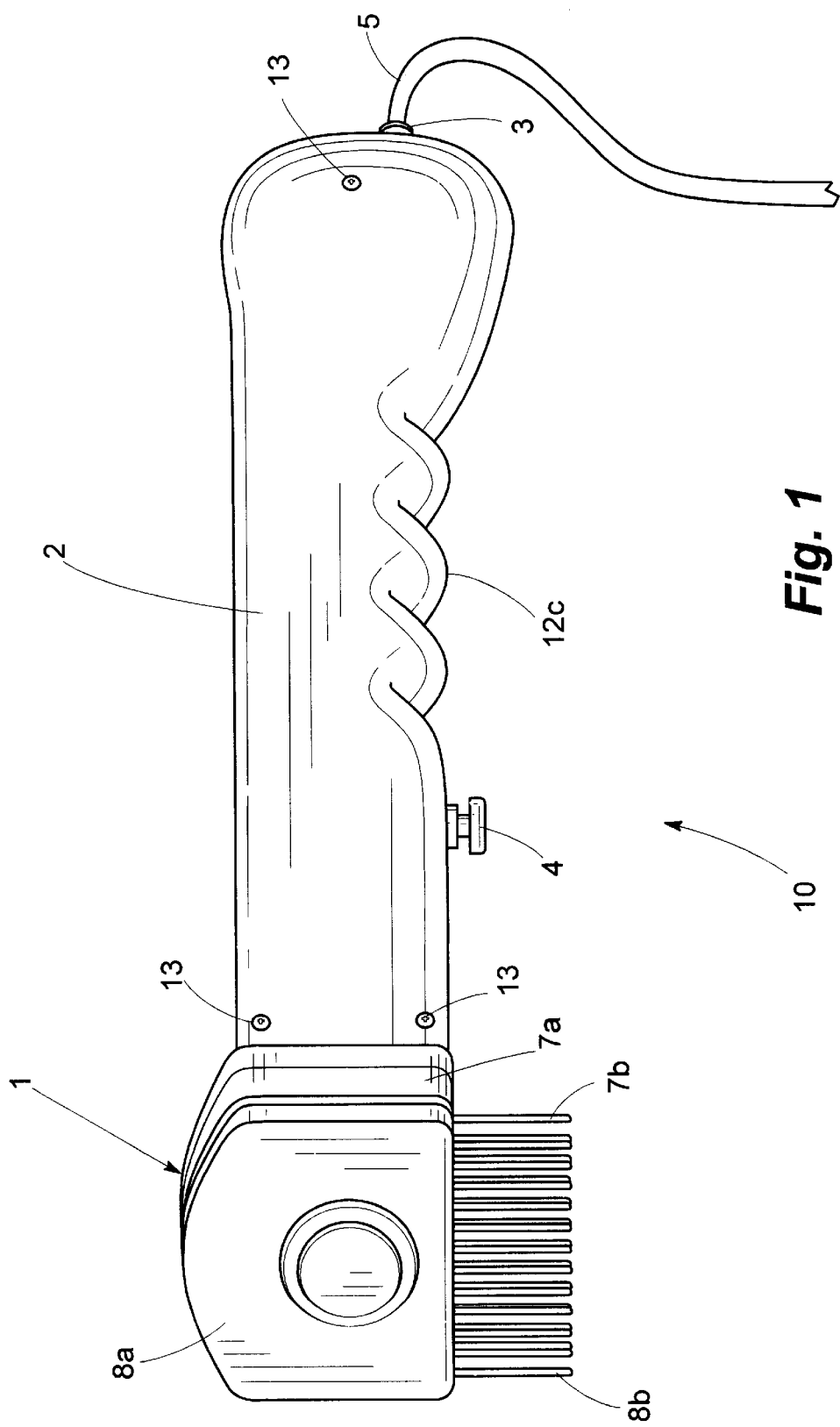
FIG. 1 is a perspective view of an apparatus, including a combing unit, a handle unit and a switch, according to the present invention.

FIG. 1 illustrates the preferred embodiment of apparatus 10 according to the present invention, comprising a combing unit 1, an elongated handle unit 2, a connector 3, a switch 4, and an external energy conduit 5. (See FIG. 1). The combing unit 1 comprises first and second combs 7, 8, each comprising a body and a plurality of teeth. For comb 7, an end of each tooth 7b attaches to and projects downward from body 7a; and for comb 8, an end of each tooth 8b attaches to and projects downward from body 8a.

Figure 2:
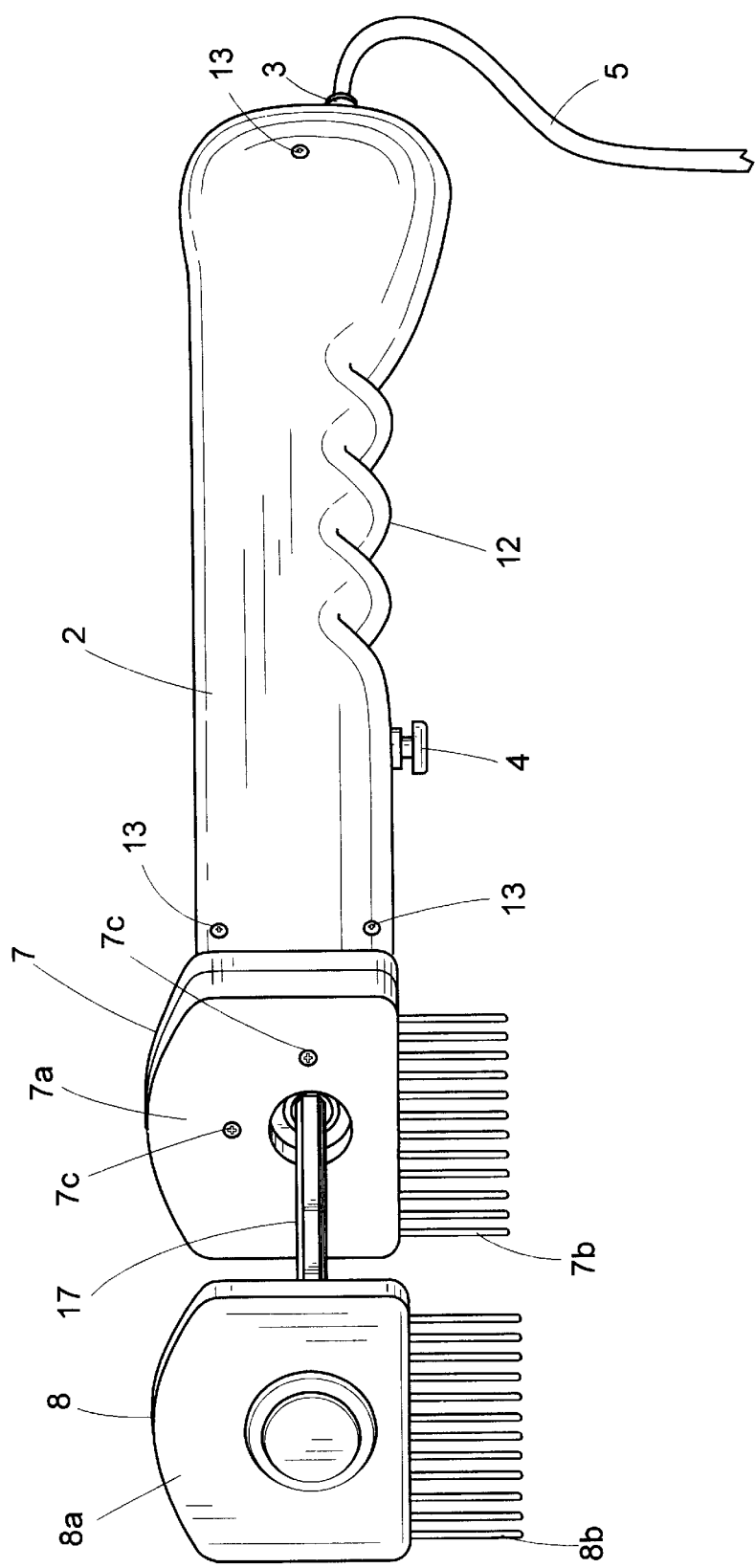
FIG. 2 is a perspective view of the apparatus showing one of the combs being displaced from the other comb.
Figure 3:
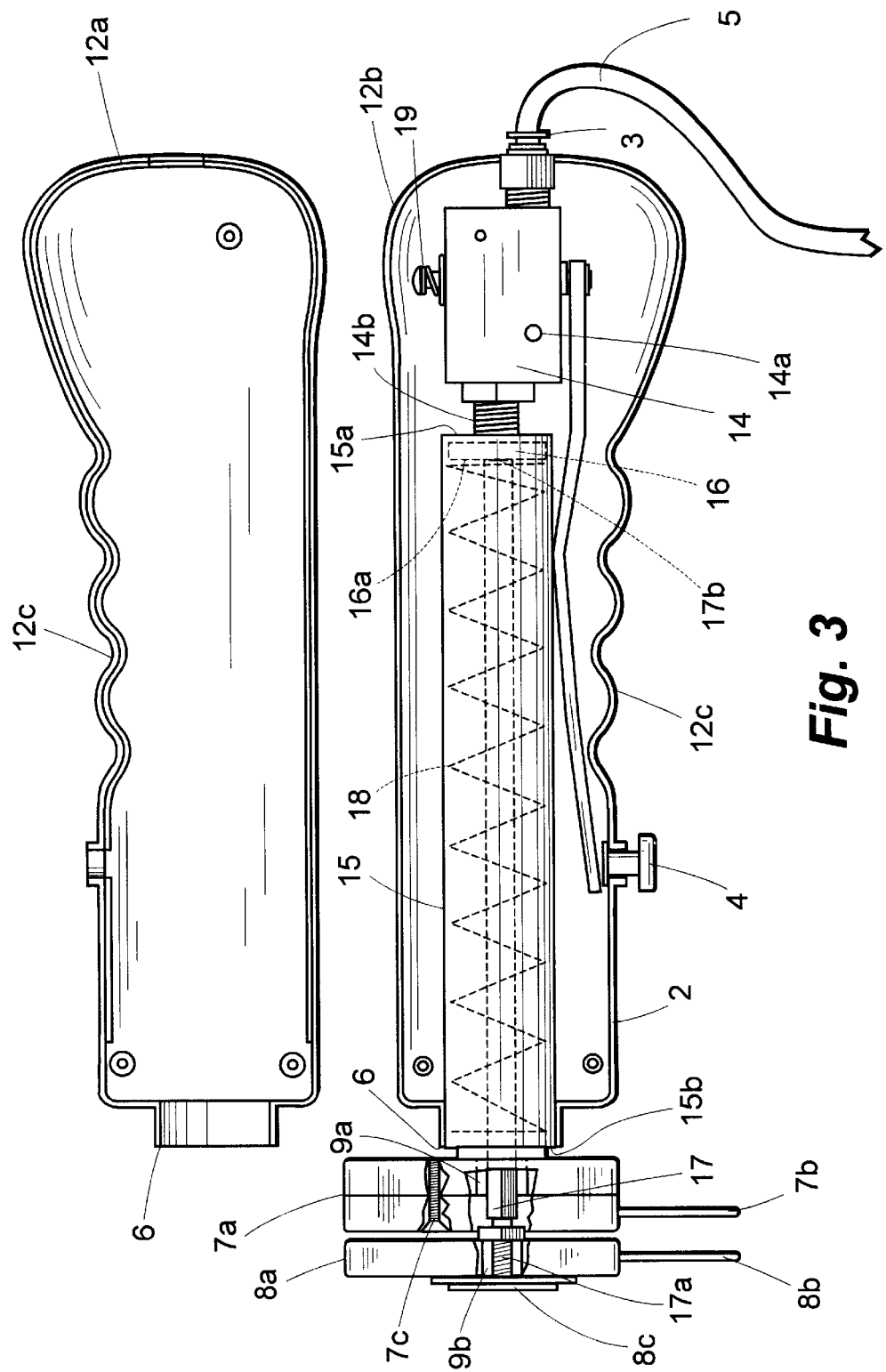
FIG. 3 is a side internal view of the handle unit, illustrating an internal energy conduit device and the relationship between the switch and a valve used to control the flow of energy into and through the conduit.

Comb 7 is stationary with respect to the handle unit 2. An affixation device 7c, such as threads and screws, fixes the comb 7 to the front end 6 of a front portion of the handle unit 2. (See FIGS. 1 through 3). In contrast, comb 8 can be controlled so as to adaptively move back and forth with respect to the handle unit 2. In a normal or resting mode, comb 8 is adjacent to comb 7. However, when the switch 4 is activated so as to allow energy to flow into and through an internal energy conduit means encased within the handle unit 2, the comb 8 forcefully moves forward from its initial position, i.e., away from the first comb 7, thereby creating a strong combing action. (See FIG. 2).

Comb 8 can be adaptively moved because it is connected to rod 17 that moves forward and backward in response to the user's control of the switch 4. Rod 17 has a first portion encased within the handle unit 2 and a second portion extending beyond the handle unit 2 so that it can be connected to the comb 8 after passing through the shaft unit 9a, which is enclosed, wrapped or encased within the body 7a of the comb 7. (See FIG. 3). The shaft unit 9a is non-rotating and defines a hollow passage through which rod 17 passes before being connected to the body 8a of the comb 8. In the preferred embodiment, a part of the rod 17 is received within a second shaft unit 9b defining a hollow passage within the body 8a. A threaded end 17a of the rod 17 is fixed to a side of the body 8a by an affixation device 8c.

In the preferred embodiment, the second comb 8 moves in tandem with rod 17. However, those skilled in the art will appreciate that either or both of combs 7, 8 can be caused to forcefully move in response to a user's control of the switch 4. In addition, those skilled in the art will appreciate that one comb may replace the pair of combs 7, 8.

The handle unit 2 comprises an external covering 12 and an internal force conduit means, which allows the flow of energy or force (hereinafter "energy") necessary to effectuate the movement of the rod 17 and comb 8. In the preferred embodiment, the external covering 12 is made of plastic, has an undulating underside 12c so as to facilitate grasping of the apparatus 10 by users thereof, and comprises two parts 12a and 12b, which are affixed to devices encased within or to each other using locking devices, such as threads and screws, 13. (See FIGS. 2 through 4). Those skilled in the art will understand that the external covering 12 may be made of a number of different shapes and out of light metal, fiber optic, or the like material.

In the preferred embodiment, compressed air, flowing into and through the internal energy conduit means, causes the movement of comb 8. For this purpose, an air compressor (not shown in the figures) becomes attached to the handle unit 2 via the external energy conduit 5 and connector 3 when the apparatus 10 is being used. (See FIGS. 1 through 3). Furthermore, the handle unit 2 encases a switch controlled valve 14 and a pneumatic cylinder 15 defining a hollow inner space in which are placed a piston 16, a portion of rod 17 and a spring 18.

The valve 14 is connected to the connector 3 and receives compressed air flowing into the handle unit via the external energy conduit 5 and the connector 3. The valve 14 defines a channel that can be adaptively aligned or de-aligned with respect to pneumatic cylinder 15 depending on a user's action on the switch 4. When the switch 4 is released, the channel of the valve 14 is de-aligned with respect to the pneumatic cylinder 15, and the compressed air entering into the handle unit is released via an escape port 14a defined by the valve 14. When the switch 4 is pressed, the channel of the valve 14 is aligned with respect to the cylinder 15, and the compressed air flowing into the handle unit 2 is allowed to flow into and through the pneumatic cylinder 15. A bridge element 14b is used to connect the valve 14 and the cylinder 15.

In a normal or resting mode, piston 16 is disposed near the back portion 15a of the cylinder 15, and the spring 18 is decompressed, extending from the front side 16a of the piston 16 toward the front portion 15b of the cylinder 15. In this mode, spring 18 exerts its elastic force on piston 16 and thus holds, keeps, or maintains piston 16 near the back portion 15a. The end 17b of the rod 17 is connected axially centered to the front side 16a of the piston 16 and extends beyond the handle unit 2 so that the end 17a is connected to the comb 8. Rod 17 is placed in the axially hollow center space defined by spring 18; and piston 16, rod 17 and spring 18 are aligned with respect to the axial center of the cylinder 15. A valve spring 19 performs the function of keeping in place valve 14 in its resting mode; this function is similar to that of spring 18 keeping piston 16 toward the back of cylinder 15.

In an operational mode, when a user presses the switch 4, the channel of the valve 14 becomes axially aligned with piston 16, and compressed air is allowed to flow into and through cylinder 15. The sudden entry and the force of compressed air act on piston 16 so as to move the piston toward the front portion 15a, which movement in turn compels rod 17 forward and compresses spring 18. In the preferred embodiment, rod 17 moves forward about four (4) additional inches beyond the handle unit 2 when it is caused to move forward by an action on the switch 4. As discussed previously, the comb 8 moves together with the rod 17 and thus generates a strong combing action for facilitating de-matting of animal hair. As those skilled in the art will appreciate, the length of the rod 17 can be adjusted so that it would move forward by an increment smaller than four (4) inches in response to the switch 4 being activated.

When the user releases the switch 4, valve 14 becomes operationally disconnected from cylinder 15, and compressed air is prevented from flowing into cylinder 15. In the absence of force acting on piston 16 and moving the piston forward, spring 18 becomes decompressed and pushes the piston toward the back portion 15a. The backward movement of the piston 16 in turn causes rod 17 to move backward, which movement in turn causes comb 8 to move toward its initial position prior to the user's action of pressing the switch 4. Accordingly, piston 16, rod 17, spring 18 and comb 8 also move toward their initial positions, ready for the user to re-activate the switch 4. In usage, a consumer places the comb unit 1 in or near matted animal hair and repeats pressing and releasing of the switch 4 to repeatedly generate strong combing actions according to the present invention.

A pneumatic cylinder having a non-rotating hexagonal rod is preferably used for the cylinder 15, because a hexagonal rod is less likely to become disconnected from the body 8a of the comb 8 than a circular rod as it moves back and forth. An example of such a cylinder is model number SR-063-NR, manufactured by Bimba Manufacturing Company in Monee, Ill., U.S.A. A typical switch unit that can be used for switch 4 is model number MB-32, manufactured by Bachman Valve Corporation in Bristol, Tenn., U.S.A.

In the preferred embodiment, the bodies of the combs 7, 8 are made of plastic, and teeth 7b and 8b are preferably made of steel. However, they can be made of any material having similar hardness, such as plastic, wood, and/or other metallic elements as long as such material can facilitate combing of matted animal hair. In particular, teeth 8b should be strong enough to withstand the sudden force that pulls the teeth forward while they are placed in matted animal hair. Each tooth tapers from the end connecting to the body of combs 7 or 8 to its opposite end. Furthermore, the tip of each tooth is blunted or rounded off so as to reduce the likelihood of accidentally injuring the animals.

In the preferred embodiment, the length of the handle unit 2 is about eight (8) inches, and the circumference about the handle's lengthwise mid-point is about five (5) inches. The width and height of the comb unit 1 is about three (3) inches each. The thickness of the combs 7 and 8 is about two-quarters and one-quarter of inch, respectively. The thickness of comb 7 is about twice that of comb 8 because an affixation device 7c is placed internal to body 7a of comb 7b. (See FIG. 3).

As those skilled in the art will understand, a double acting cylinder can be used in place of the single cylinder described herein. In such a case, an additional piston is used instead of a spring to push the piston 16 back toward its initial position. Furthermore, devices other than pneumatic cylinder can be used to feed, inject, or bring about the energy necessary to forcefully push forth at least one comb. Examples of such devices are electrically or magnetically driven shaft systems.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiment may be varied without departing from the spirit of the invention, and the exclusive use of all modifications which come within the scope of the appended claims is reserved.

What is claimed is:

1. A device for de-matting animal hair, comprising;
   a rod having a first portion encased in a handle unit and a second portion extending beyond the handle unit;
   a first comb comprising a plurality of teeth and a body to which one end of each tooth is attached; and said first comb being connected to a part of the second portion of the rod;

a switch operationally connected to the rod for adaptively controlling the movement of the rod and the first comb; and an energy conduit means encased in the handle unit;

wherein the first comb moves in response to energy allowed to flow into and through the energy conduit means in response to a first action on the switch.

2. The device according to claim 1, wherein the energy conduit means comprises a pneumatic cylinder comprising a piston to which a part of the first portion is connected and wherein the rod moves in response to the piston moving forward.

3. The device according to claim 2, wherein the pneumatic cylinder further comprises a spring; said spring being compressed or decompressed in response to the first action and a second action on the switch, respectively; and said de-compression of the spring causing the rod, the first comb and the piston to move toward their initial positions prior to the first action.

4. The device according to claim 1, wherein the handle unit further encases a valve that can be adaptively opened or closed with respect to the energy conduit means so as to allow or disallow, respectively, the flow of energy into and through the energy conduit means.

5. The device according to claim 1, wherein the connection between the first comb and the rod is accomplished by fixing an end of the rod to the body of the first comb; and the device according to claim 1 further comprising a second comb having a second plurality of teeth and a second body; said second body encasing a shaft defining a hollow passage through which at least a part of the second portion of the rod passes before the rod is connected to the first comb.

6. The device according to claim 5 wherein the second comb is affixed to the handle unit so as to be stationary with respect to the handle unit.

7. The device according to claim 1, wherein the rod is hexagonal and centrally and axially aligned within a hollow center space defined by the spring.

8. The device according to claim 1, further wherein each of the plurality of teeth tapers from the end connected to the body of the first comb to the opposite end of each of the teeth.

9. A device for de-matting animal hair, comprising:

first and second combs;

an elongated handle unit having front and back portions; the first comb being affixed to a part of the front portion of the handle unit so as to be stationary relative to the handle unit;

the handle unit comprising a pneumatic cylinder and a valve, said valve defining a hollow channel; and the pneumatic cylinder further comprising a rod which extends beyond the handle unit and to which the second comb is affixed; and a switch for controlling the valve such that the channel of the valve is adaptively opened or closed with respect to the pneumatic cylinder.

10. The device according to claim 9, wherein the pneumatic cylinder further comprises a piston to which the rod is connected in an axially centered position; said piston being pushed forwardly in response to compressed air entering when the valve is opened in response to a first action on the switch.

11. The device according to claim 10, wherein the pneumatic cylinder further comprises a spring extending from a front side of the piston to a front portion of the pneumatic cylinder; and the rod being axially centered and aligned with respect to a hollow center space defined by the spring.

12. A device for de-matting animal hair, comprising a first comb having a plurality of teeth and a body;

a handle unit having front and back portions, said handle unit encasing a first portion of a rod whose second portion extends beyond the front portion of the handle and connects to the body of the first comb;

the handle unit further encasing a conduit means for allowing energy to flow from the back portion to the front portion of the handle unit; and a switch for adaptively controlling energy to flow into and through the conduit means.

13. The device according to claim 12, wherein a first action on the switch allows the energy to flow into the conduit means, which flow causes the rod to move forward, thereby causing the first comb to be displaced from its initial position.

14. The device according to claim 13, wherein a second action on the switch prevents energy from flowing into the conduit means and causes the rod to move backward, thereby causing the first comb to move toward its initial position prior to the first action.

15. The device according to claim 14, further comprising a second comb being attached to a part of the front portion of the handle unit so as to be stationary relative to the handle unit.

16. The device according to claim 12, wherein the handle unit is elongated and the energy that is adaptively controlled to flow into and through the conduit means is conveyed by compressed air.

17. The device according to claim 12, wherein the handle unit further comprises a valve that is adaptively controlled by the switch so as to allow or prevent the flow of energy into and through the conduit means.

* * * * *